United States Patent

[11] 3,597,681

[72] Inventors William B. Huckabay
Dallas, Tex.;
John K. Godbey, Dallas, Tex.; John O. Ely, deceased, late of Lexington, Mass. (by La Verne Barton Ely, executrix)
[21] Appl. No. 637,313
[22] Filed Jan. 30, 1957
[45] Patented Aug. 3, 1971
[73] Assignee Chevron Research Company
Continuation-in-part of application Ser. No. 267,264, Jan. 19, 1952, now abandoned.

[54] NUCLEAR MAGNETIC WELL LOGGING
14 Claims, 5 Drawing Figs.
[52] U.S. Cl. .................................................. 324/0.5R
[51] Int. Cl. .................................................. G01n 27/78
[50] Field of Search .................................. 324/0.5, 43

[56] References Cited
UNITED STATES PATENTS
3,250,986 5/1966 McKay .................... 324/0.5

Primary Examiner—Michael J. Lynch
Attorney—D. Carl Richards

ABSTRACT: This invention relates to nuclear magnetic resonance well logging where hydrogen nuclei are polarized in a unidirectional field. Free precession of nuclei is established at a measuring level in the well bore by generating a magnetic field at an angle to the unidirectional field and removing the same. Output signals are generated having a frequency characteristic of the precession of the macroscopic moment vector of hydrogen nuclei and a characteristic dependent upon the number of hydrogen nuclei. The output signal is then recorded in correlation with the depth of the measuring level to produce a record indicative of regions in which hydrogen atoms are concentrated.

JOHN O. ELY
WILLIAM B. HUCKABAY
JOHN K. GODBEY
INVENTOR.

BY D. Earl Richards
AGENT

PATENTED AUG 3 1971 3,597,681

JOHN O. ELY
WILLIAM B. HUCKABAY
JOHN K. GODBEY
INVENTOR.

BY D. Carl Richards
AGENT

NUCLEAR MAGNETIC WELL LOGGING

This application is a continuation-in-part of application Ser. No. 267,264, filed Jan. 19, 1952, now abandoned.

This invention relates to the study of formations adjacent a well bore by nuclear magnetic induction and more particularly to logging of formations to delineate those formations which contain atoms of a preselected element.

It is an object of the present invention to provide a method and means for the logging of well bores by a plurality of measurements at different levels therein of a preselected element and particularly of hydrogen in order to produce distinctive indications of the presence of hydrogen-bearing materials in the regions of the plurality of measuring levels in the well bore.

Investigations of matter by nuclear magnetic induction techniques are useful in determining the basic properties of matter. Each nucleus of certain elements exhibits peculiar properties that permit it to be distinguished from those of other elements. Additionally the nucleus of a given atom in molecular combination with other atoms exhibits properties peculiar to that combination. In U.S. Pat. No. 2,561,489 issued to Bloch et al. there is disclosed a system for performing such an investigation by means of forced motion nuclear induction resonances. Another method of investigation by nuclear magnetic induction techniques utilizes a phenomenon known as spin echoes which is based upon "free motion" as contrasted with the forced motion approach of the above-identified Bloch patent. Although distinctions between the two methods will be discussed in more detail hereafter, a general discussion of the spin echo technique by E. L. Hahn is found in "Physical Review," Volume 80, Series 2, at Page 580 et seq.

In accordance with the present invention the free motion or spin echo technique is utilized for production of nuclear measurements of formations in situ. It is desirable to indicate concentrations of hydrogen atoms in petroliferous molecules as to distinguish from hydrogen atoms found in either water or formation solids or from sodium atoms in water or formation solids. In prior art procedures above referred to, the investigations are carried on in a laboratory where a high strength unidirectional magnetic field is readily maintained substantially uniform over the entire volume of a sample under investigation. In measurements in well bores, it is impossible to obtain controlled laboratory conditions. However, applicants have devised a procedure by which measurements may be made in the formations adjacent a well bore.

In accordance with one aspect of the present invention wherein nuclei in formations adjacent a well bore which possess a magnetic moment are polarized in a unidirectional magnetic field in the formations at a measuring level to establish a predominant orientation thereof, there is provided a combination of means for producing magnetic fields substantially normal to the unidirectional field at the measuring level whereby the predominant orientation of nuclei is disturbed. Detecting means are provided responsive to varying fields due substantially entirely to precession of said nuclei in said unidirectional field following removal of said magnetic field with means further being provided which are responsive to the detecting means for measuring the varying fields.

In accordance with another aspect of the present invention there is established a unidirectional magnetic field in formations adjacent a well bore characterized by an intensity of a predetermined maximum immediately adjacent the well bore and which decreases in value with distance from the walls of the well bore to establish a net spin population of nuclei within the field at thermal equilibrium exhibiting a macroscopic magnetic moment which is oriented parallel to the magnetic field. An alternating magnetic field is then applied with orientation substantially normal to the unidirectional magnetic field preferably characterized by frequency between an upper limit $f_1 = \gamma_1 H_o/2\pi$ and a lower limit $f_2 = \gamma_2 H_o/2\pi$ where $\gamma_1$ is the gyromagnetic ratio for a selected element, preferably hydrogen, and $\gamma_2$ is the gyromagnetic ratio for atoms of the closest interfering element, i.e., sodium, and $H_o$ is the magnitude of the unidirectional magnetic field. Removal of the varying magnetic field causes free precession of the macroscopic magnetic moment about an axis parallel to the unidirectional magnetic field. The varying magnetic field is reapplied to establish a complex spectral distribution of moment components in which the precession of the microscopic moments making up the macroscopic moment exhibits constructive interference following the removal of the varying magnetic field. The magnitude of the macroscopic magnetic vector upon occurrence of constructive interference is measured.

In accordance with still a further aspect of the invention, the alternating magnetic field is given a frequency spectrum, the limits determined by the gyromagnetic ratios for hydrogen and sodium to produce a multiplicity of spectral distributions of moment components corresponding to or determined by the unidirectional magnetic field in a volume adjacent the well bore to increase the echoes resulting from such constructive interferences.

For further objects and advantages of the invention and for a more complete understanding thereof, reference may now be had to the following description taken in conjunction with the accompanying drawings in which:

FIG. 1 schematically illustrates a nuclear magnetic induction logging system;

Figure 1:
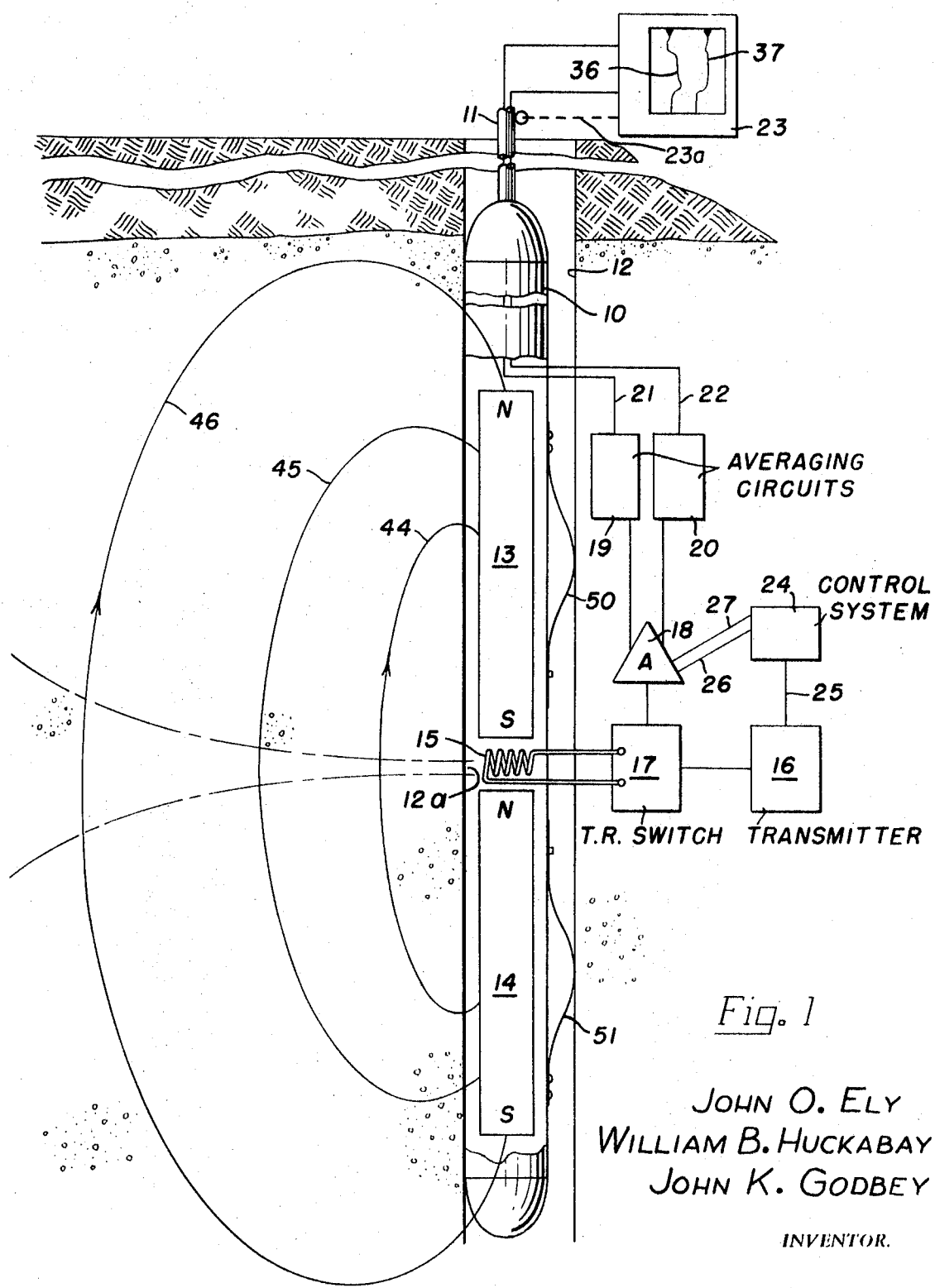

In order to explain this invention it will be helpful first to present a brief statement of facts relating to the structure of the atom insofar as pertinent to the present invention. For extensive and more formal treatments reference may be had to the many texts on atomic theory.

Generally the interaction of atoms with the external world is thought to occur by way of a cloud of negatively charged electrons diffused about and surrounding a positively charged center of nucleus. The nucleus is characterized not only by positive charge but also by most of the mass associated with the atom. The difference in chemical properties as between different atoms depends upon the number of electrons per atom which, of course, depends in turn upon the nuclear positive charge. Since the nucleus is characterized by an electrical charge which is generally considered to be moving at some velocity, the interaction of such moving charges and a magnetic field provides an approach to a means for designating the nuclear charge so as to identify particular atoms.

More particularly, each nucleus may be considered to have a mass and an associated charge which spins or rotates about an axis thus exhibiting a moment with respect to the axis which passes through the nucleus. A parallel may be drawn between an isolated atom and a gyroscope which is characterized structurally in having a gyroscopic element which spins about and is mounted on a bar magnet at its axis. For an isolated nucleus the forces and motions involved are similar to those in such a mechanical system.

If an individual nucleus is suddenly placed in a magnetic field, the interaction between the magnetic moment of the nucleus and the magnetic field causes the axis of spin to precess about an axis parallel to the magnetic field in the same manner as a gyroscope when deflected from an equilibrium position. It is important to note that although the forces involved in foregoing phenomena are of relatively small magnitude compared to the thermal forces, if a quantity of a given element is placed in a magnetic field it produces or exhibits a macroscopic magnetic moment which is the sum of all of the individual or microscopic moments. The macroscopic moment may be predominantly controlled by the magnetic field and because of energy transfer from the dynamic system of spinning atomic nuclei, the macroscopic moment attains an equilibrium in a magnetic field. In equilibrium, the macroscopic moment is in alignment with the magnetic field. As the macroscopic moment, which may be represented by a vector, approaches coincidence or alignment with the magnetic field vector, the precession of the magnetic moment vector is at a frequency peculiar to the nucleus in the sample of matter. For example, the macroscopic moment of a hydrogen sample in a magnetic field of given strength will precess at a first frequency while sodium in the same field will precess at an altogether different frequency. It has been shown that the angular velocity of such precession ($\omega$ in radians per second) may be expressed by the following relation:

$$\omega = \omega_o = \gamma H_o; \quad (1)$$

where $\gamma$ is the gyromagnetic ratio, i.e., the ratio of the nuclear magnetic moment to angular momentum, characteristic of each nucleus, and $H_o$ is the magnitude of the magnetic field. For example, the gyromagnetic ratio for hydrogen, $\gamma_h = 2.66 \times 10^4$. In contrast, the gyromagnetic ratio for sodium, $\gamma_{Na} = 7.04 \times 10^3$. Other elements have similarly distinctive gyromagnetic ratios.

In accordance with Equation (1), the macroscopic moment vector of hydrogen precesses about an axis parallel to the magnetic field at an equilibrium frequency which is different from that of sodium. If, after reaching equilibrium, a varying or alternating magnetic field is impressed normal to the equilibrium position of the macroscopic magnetic moment, it will cause the macroscopic moment vector to appear to rotate at the frequency of precession of, for example, hydrogen in the magnetic field causing the equilibrium distribution. Only the hydrogen atoms may be affected by reason of the frequency selectivity with respect to the alternating magnetic field indicated by Equation (1). As a result, the macroscopic magnetic moment is displaced from alignment with the magnetic field. If now the varying magnetic field is removed, the system attempts to regain the equilibrium condition.

A measurable signal is thus provided as the macroscopic magnetic moment attempts to realign itself with the magnetic field. The frequency of the signal will be that of the precession of said macroscopic magnetic moment in the polarizing magnetic field and will be of magnitude related to the number of nuclei so influenced. It will be appreciated that the macroscopic magnetic moment may reach equilibrium under the influence of the earth's magnetic field present in the region adjacent a well bore and thus precession relative thereto may be measured. If throughout the course of a measurement a stronger or artificial magnetic field is provided in said formations to augment or completely override the earth's magnetic field as a polarizing force, then if the varying magnetic field is reapplied after a predetermined time interval and again removed, there may be established a spectral distribution of moment components in a plane normal to the magnetic field. This distribution freely precesses to form by constructive interference a resultant "echo" in the same plane at a time following the second application of the varying magnetic field equal to the predetermined time interval. The magnitude of the macroscopic moment at the instant constructive interference occurs is directly related to the mass-charge properties of the nuclei. More particularly, the magnitude of the macroscopic moment at the instant of constructive interference is a measure of the time $T_1$, the "longitudinal relaxation time," required for the macroscopic magnetic moment to change from disorientation to orientation with the external magnetic filed where the nuclei are in a given field of strength $H$.

Therefore the longitudinal relaxation time, $T_1$, is a measure of or an index to the molecular combination of the atom. For example, for hydrogen atoms in hydrocarbons such as a pure, light machine oil, $T_1$ is equal to 0.075 seconds; for hydrogen atoms in a heavy machine oil, 0.013 seconds; in a mineral oil, 0.007 seconds; and in distilled water, 2.3 seconds. Solids such as rocks along the wall of a well bore exhibit a time $T_1$ very much higher than that of the salt water commonly encountered. Because of this spread in characteristic data, it is possible to ascertain the type compound therein containing hydrogen atoms.

The longitudinal relaxation time $T_1$ may be measured by applying two pulses of varying magnetic field as above described, spaced by a time interval $\tau$. Following the second pulse by a time interval $T$ which is relatively long compared to $\tau$, the varying magnetic field is applied a third time. Following the third application, constructive interference of the spectral distribution of the moment components occurs. Measured values of the magnitude of the macroscopic moment upon constructive interference for two different values of $T$ provide data, as will hereinafter be explained, for computation of the value $T_1$.

Figure 2:
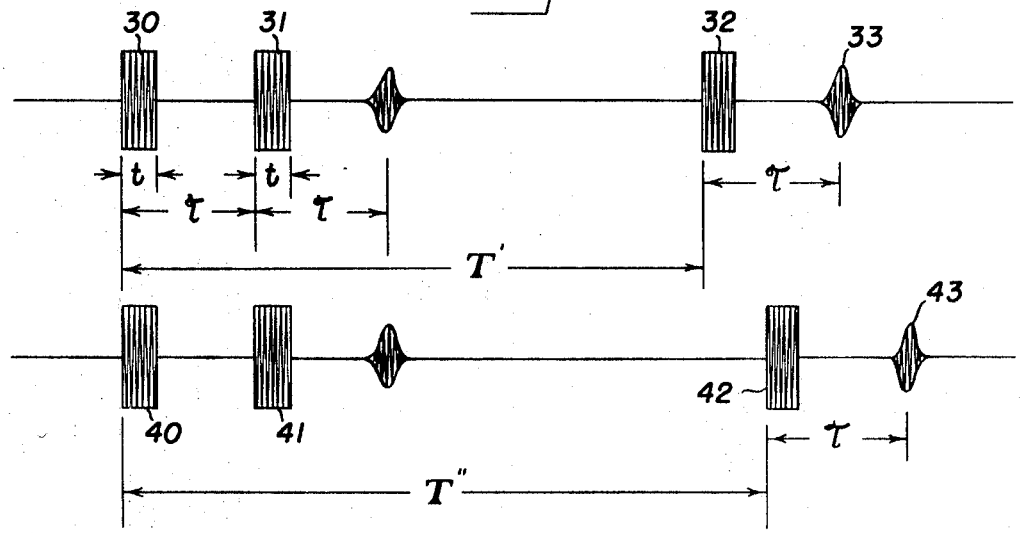
FIG. 2 illustrates a preferred sequence of operations of the system of FIG. 1.

FIGS. 1 and 2 illustrate a system and its operation for obtaining two measurements directly utilizable for calculation of the longitudinal relaxation time $T_1$. Referring first to FIG. 1, a borehole instrument 10 is suspended as by a cable 11 in a borehole 12. The device 10 includes a pair of elongated bar magnets 13 and 14 oriented in an end-to-end array with the south pole of magnet 13 adjacent the north pole of magnet 14 to produce a magnetic field in the formations adjacent thereto. Magnetic flux lines 44, 45 and 46 indicate in a general manner the flux distribution through the formations. A coil 15 is positioned at a point intermediate the opposed ends of magnets 13 and 14 with its axis normal to the axis of the instrument 10. Upon excitation of coil 15, there is produced a magnetic field normal at least in part to the unidirectional field produced by the magnets 13 and 14. A transmitter 16 is connected by way of a transmit-receive switch 17 to the coil 15 for excitation thereof. Additionally, a receiver-amplifier 18 is connected to the transmit-receive switch 17. The output of amplifier 18 is applied to two averaging circuits 19 and 20 which in turn are connected by way of signal channels 21 and 22 to a dual recorder 23 positioned at the surface of the earth. The dual recorder 23 provides a continuous indication in correlation with the depths in the borehole at a plurality of measuring levels therein of output signals, each having a frequency which is characteristic of the precession of the macroscopic moment vector of hydrogen. To produce correlation of the measurement with the depth of each measuring level, any suitable means may be provided as, for example, a connection 23a between the the chart drive of the recorder 23 and the supporting cable 11 for the borehole instrument 10. A control system is connected both to the transmitter 16 by way of channel 25 and to the receiver amplifier 18 by channels 26 and 27.

The unidirectional magnetic field produced by the bar magnets 13 and 14 has a maximum intensity in the formations at a point closest the magnets, or immediately adjacent the walls of the borehole, which depending upon the strength of the magnets may augment or override the earth's magnetic field. The magnetic field strength decreases approximately as the cube of the distance from the borehole. When it is desired to detect formations containing only hydrogen compounds, the hydrogen atoms and more specifically only the hydrogen atoms in the formations should be excited. The excitation of such atoms is produced by application of a radiofrequency signal to coil 15 from transmitter 16. The frequency of the latter signal is computed from Equation (1) expressed in the following form:

$$f = \gamma_h H_o'/2\pi \quad (2)$$

where $H_o'$ is the maximum field strength in the formations; and $\gamma_h$ is the gyromagnetic ratio for hydrogen.

Where the magnetic field is not uniform and it is desired to study not only the formations in the very thin shell around the borehole at which the field strength has the particular value $H_o'$ required by Equation (2) for a given frequency but also study points deeper in the formation, the transmitter output also preferably includes one or more frequencies between frequency $f$ [Equation (2)] and frequency $f'$ determined by the expression:

$$f'=\gamma_h H_o''/2\pi \quad (3)$$

where $H_o''$ is the strength of the magnetic field at, for example, the point designated by the flux line 45.

Frequency $f'$ may have any value to the limit that $$f' < \gamma_{Na} H_o'/2\pi \quad (4)$$

where $\gamma_{Na}$ is the gyromagnetic ratio of sodium.

Within these limits all of the atoms in the formations lighter than sodium exhibiting an electromagnetic moment within the radius of flux line 45 will be excited at its resonant frequency. In general, atoms having an even number of protons and an even number of neutrons in the nucleus exhibit an electromagnetic moment. However, hydrogen is the only atom lighter than sodium having a magnetic moment occurring in the formations in significant quantities so that interference from other atoms, when excitation is limited as above indicated, will be negligible. Hydrogen has the highest gyromagnetic ratio of any element, the gyromagnetic ratios decreasing generally in accordance with the location of the element in the atomic scale. Thus by limiting the excitation frequency band at one limit in dependence upon the maximum field strength in the formations and at the other limit in dependence upon the gyromagnetic ratio of sodium, it is assured that any sensible reaction will be due substantially entirely to hydrogen atoms.

In one form of the invention the transmitter 16 applies a signal to coil 15 of specified frequency components or all frequencies between the frequency limits $f$ and $f'$ of Equations (2) and (4). A signal of the latter nature will hereinafter be referred to as a "white noise" signal.

Further in accordance with the invention and as illustrated in FIG. 2, a pulse 30 of alternating current from transmitter 16 is applied to coil 15 for a first period $t$. The signal is then suddenly removed. After a predetermined time interval $\tau$ a second signal 31 of like character is applied for a like period $t$. Thereafter and following pulse 30 by a time $T'$ a third pulse 32 is applied for a like period $t$. Following application of pulse 32 by the time interval $\tau$ there appears, as an induced voltage in the coil 15, a signal pulse 33 made up of frequencies $f-f'$ appearing in time symmetrically with respect to the time $\tau$ after pulse 32. Such induced signals are applied from the transmit-receive switch to the broad band amplifier 18. The band width of amplifier 18 is at least equal to $f-f'$ or may be tuned to said above-mentioned specified frequency components. In one of the averaging circuits, for example averaging circuit 19, there is produced a voltage proportional to the amplitude of pulse 33, the latter voltage being transmitted by way of channel 21 to recorder 23 where variations in this amplitude appear as trace 36.

In another sequence of operations a first pulse 40 is applied. After a time $\tau$ a second pulse 41 is applied. At a time $T''$ after pulse 40 a third pulse 42 is applied, time $T''$ being larger than $T'$. Following pulse 42 there appears in coil 15 an induced voltage pulse 43 having an amplitude different from the pulse 33 by reason of the difference in times $T'$ and $T''$. The pulse 43 is applied to amplifier 18 and is averaged in circuit 20 to produce a voltage proportional to the magnitude of pulse 43. The latter voltage is transmitted by way of channel 22 to the surface recorder 23 and it appears as trace 37. The amplitudes of the latter voltages, the times $T'$ and $T''$ and the longitudinal relaxation time of the hydrogen atoms are related by the following expression:

$$A_{33}/A_{43} = T''-T'/T_1 \quad (5)$$

By switching the amplifier 18 from averaging circuit 19 to averaging circuit 20 in accordance with a preselected program of pulse transmission controlled by the system of 24, as is well understood by those skilled in the art, the traces 36 and 37 will provide a continuous indication of variations with depth in the parameters required for calculation of the longitudinal relaxation time $T_1$. As shown in FIG. 1, the traces 36 and 37 are continuous and they serve to produce indications of the magnitudes of the detected signals at the various measuring levels in the well bore. As well understood by those skilled in the art, recorders 23 utilized for the measurement of subsurface characteristics in a well bore, in general, include a drive for the chart for moving it in correlation with the depths of the instrument in the well bore. Such arrangements may be utilized for the recorders 23 or other means may be utilized in order that the continuous records 36 and 37 will, as indicated above, be established in correlation with the zones in which the measurements have been made. Of course, if desired, circuit means may be provided for carrying out the computation indicated by Equation (5). However for delineation of hydrogen-bearing formations, the two traces 36 and 37, which are respectively representative of variations in the amplitudes $A_{33}$ and $A_{43}$, will be found useful.

Where, in spin echo type measurements illustrated in FIG. 2, the precession frequencies of hydrogen atoms within range $f$ to $f'$ are in the radio frequency range for practical and feasible values of $H_o$, the varying or alternating field from coil 15 may extend for only a limited range into the formations. The varying or alternating field from coil 15 has the same effect as a magnetic field which rotates about an axis normal to the axis of coil 15, causing rotation of the macroscopic moment vector about the latter axis. To assure maximum penetration of such signals into the formations and to eliminate the possibility of shielding of the instrument by a sheath of conducting borehole liquids that might otherwise deleteriously affect operations, it may be found to be necessary to urge the logging instrument 10 against the side of the borehole 12. This may be accomplished by use of bow springs 50 and 51 fastened to the periphery of the instrument 10 preferably at points in a plane common to the axis of the instrument 10 and the axis of coil 15. Measurements of free motion or precession at lower frequencies in the earth field may also be made with possibility of greater penetration.

Figure 3:
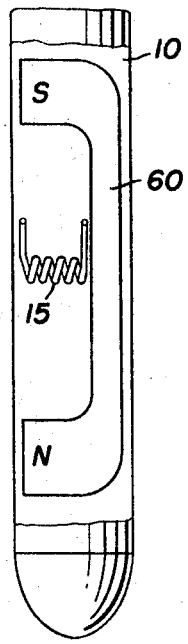
FIG. 3 is a modification of the magnet structure of FIG. 1.
Figure 4:
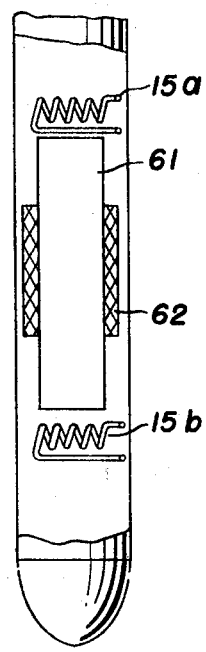
FIG. 4 illustrates an electromagnetic means for establishing a unidirectional field.
Figure 5:
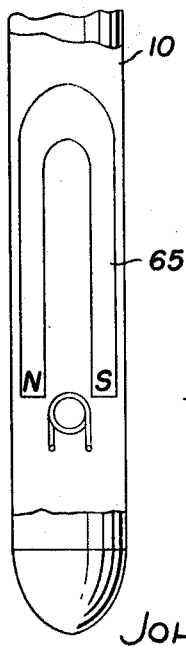
FIG. 5 is a further modification of a field producing and echo detecting system.

Referring now to FIGS. 3, 4 and 5, modifications of the unidirectional field producing means are illustrated. In FIG. 3 a generally U-shaped magnet 60 supported with its base parallel to the axis of the unit 10 focuses the magnetic field and concentrates the field in formations immediately adjacent the coil 15. In FIG. 4 an electromagnet is utilized, comprising a core 61 encircled by a winding 62 which may be energized from a source of unidirectional current (not shown) sufficient to establish a field of desired strength in the formations. A pair of coils 15a and 15b are illustrated adjacent the ends of core 61 for generation of the varying magnetic fields normal at least in part to the field produced by the electromagnet. In FIG. 5 a U-shaped magnet 65 having its base normal to the axis of the borehole instrument 10 may also be utilized for establishing a magnetic field in the formations adjacent the borehole. It is to be understood, however, that the systems of FIGS. 3—5 may be operated substantially as described in connection with FIGS. 1 and 2.

In operation, if in the formations the maximum unidirectional magnetic field strength $H_o'$, Equation (2), is 1,000 gauss (i.e., the field strength at point 12a, FIG. 1), from Equation (2) the frequency $$f = \frac{2.66 \times 10^4 \times 10^3}{2\pi} = 4.25 \times 10^6 \text{ cps.}$$

Under the same conditions, from Equation (4), $$f' = \frac{7.04 \times 10^3 \times 10^3}{2\pi} = 1.12 \times 10^6 \text{ cps.}$$

It will thus be seen that for the foregoing operating conditions the signal from transmitter 16 may be within the frequency band from 1.12 megacycles to 4.25 megacycles for excitation substantially only of hydrogen atoms in the formations only and not in the fluids in the well bore. The zone of influence under such conditions has a boundary in the formations where the magnetic field from Equation (3), assuming $f'=1.12 \times 10^6$ c.p.s., is 265 gauss. This boundary is in the order of 1 foot from the wall of the borehole 12. For magnetic field strengths differing from the above assumed value, the frequency range may be varied as per Equations (2) and (4) to limit the excitation to hydrogen atoms only.

Thus in accordance with the present invention it will be seen that there is provided a measurable indication of the presence of hydrogen atoms in a particular molecule in the formations. If the calculated value of $T_1$ from the traces 36 and 37 is in the order of one-hundredth of a second, it may be deduced that the hydrogen atoms predominantly are bound in hydrocarbon molecules in contaminated solution. If the time $T_1$ is in the order of seconds or higher, it may be deduced that the hydrogen atoms excited are molecules of water or contaminated oil, or solid materials making up the formations. This ambiguity may be resolved by repeating the test with other frequencies in the frequency range capable of exciting sodium which, if detected, indicates presence of salt water.

While the foregoing discussion relates to measurements made in the sequence of operations illustrated by FIG. 2, it will be apparent that measurements of the spin echo following the pulse 31, FIG. 2, may be useful for delineation of structures adjacent a well bore. If it is desired to measure the magnitude of such an echo, the receiving coil 15 of FIG. 1 will be energized by a first pulse 30 which lasts for a period $t$. Following the application of pulse 30 by a time $\tau$, a second pulse 31 is applied to energize the coil to establish a system of spins. Following pulse 31 by a similar time $\tau$ the constructive interference of the multiplicity of spins produces an echo, sensed by the coil 15 as a varying or alternating magnetic field of the frequency of pulse 30 and varying in amplitude with time, having its maximum amplitude at time $\tau$ after pulse 31.

While modifications of the invention have been illustrated and described, it will be apparent that further modifications may now suggest themselves to those skilled in the art. It is intended to cover such modifications as fall within the scope of the appended claims.

What we claim is:

1. In a system for logging a well bore the improvement which comprises means for producing a unidirectional magnetic field of predetermined maximum strength $H_o$ in formations at a measuring level in said well bore to establish a predominant orientation of those nuclei in said field which possess a magnetic moment, means including a source of spaced oscillatory pulses each producing alternating magnetic fields substantially normal to said unidirectional field at said level and of a frequency of the order of but greater than $\gamma_{Na}H_o/2\pi$ cycles per second where $\gamma_{Na}$ is the gyromagnetic ratio of sodium whereby said predominant orientation of atoms having gyromagnetic ratios greater than that of sodium is disturbed, field detecting means at said level for detecting in the interval following production of two of said alternating fields a varying electromagnetic field having the frequency of said alternating field due substantially entirely to precession of hydrogen nuclei in said unidirectional field, and means for indicating the relative values of said detected fields.

2. In a system for logging a well bore the improvement which comprises means for producing a unidirectional magnetic field of predetermined maximum strength $H_o$ in formations at a measuring level in said well bore to establish a predominant orientation of those nuclei in said field which possess a magnetic moment, means for producing pulsed alternating magnetic fields substantially normal to said unidirectional field at said level and having frequency components exclusively within the limits of $\gamma_{Na}H_o/2\pi$ and $\gamma_h H_o/2\pi$ cycles per second where $\gamma_{Na}$ is the gyromagnetic ratio for sodium and $\gamma_h$ is the gyromagnetic ratio for hydrogen whereby said predominant orientation of all nuclei having gyromagnetic ratios greater than that of sodium is disturbed, and detecting means responsive to frequencies within said limits for detecting in the interval following production of two of said alternating fields varying fields due substantially entirely to precession of hydrogen nuclei in said unidirectional field, and means for indicating the relative values of said varying fields.

3. In a system for logging a well bore the improvement which comprises means for producing a unidirectional magnetic field of predetermined maximum strength $H_o$ in formations at a measuring level in said well bore to establish a predominant orientation of those nuclei in said field which possess a magnetic moment, means for producing a plurality of time-spaced pulsed alternating magnetic fields substantially normal to said unidirectional field at said level exclusively within the frequency limits of $\gamma_{NA}H_o/2\pi$ and $\gamma_h H_o/2\pi$ cycles per second where $\gamma_{Na}$ is the gyromagnetic ratio for sodium and $\gamma_h$ is the gyromagnetic ratio for hydrogen whereby said predominant orientation of all nuclei having gyromagnetic ratios greater than that of sodium is disturbed, and detecting means responsive to the frequencies of said plurality of alternating magnetic fields for detecting in the interval following production of said alternating fields varying fields due substantially entirely to precession of hydrogen nuclei in said unidirectional field, and means for indicating the relative values of said varying fields.

4. In electrical well logging the improvement which comprises an exploring unit suspended at a measuring level in said well bore and including means for producing a unidirectional magnetic field of predetermined maximum strength $H_o$ in formations adjacent thereto to establish a predominant orientation of those nuclei in said field which possess a magnetic moment, coil means in said unit oriented with its axis normal to said unidirectional field at said level, a source of alternating current having a frequency in the order of but greater than $\gamma_{Na}H_o/2\pi$ cycles per second where $\gamma_{Na}$ is the gyromagnetic ratio of sodium, switching means for momentarily connecting said source of alternating current to said coil means to establish an alternating magnetic field normal to said unidirectional field to upset the predominant orientation of atoms having gyromagnetic ratios greater than that of sodium which possess a magnetic moment, detecting means responsive to varying magnetic fields of the frequency of said source of alternating current for detecting in the interval following production of said alternating field a varying electromagnetic field due substantially entirely to precession of hydrogen nuclei in said unidirectional field, and means for indicating the relative values of said varying fields.

5. In electrical well logging the improvement which comprises an exploring unit suspended at a measuring level in said well bore and including means for producing a unidirectional magnetic field of predetermined maximum strength $H_o$ in formations adjacent thereto to establish a predominant orientation of those nuclei in said field which possess a magnetic moment, coil means in said unit oriented with its axis normal to said unidirectional field at said level, a source of alternating current having a frequency of the order of but greater than $\gamma_{Na}H_o/2\pi$ cycles per second where $\gamma_{Na}$ is the gyromagnetic ratio of sodium, a circuit including indicating means responsive to signals of the frequency of said source of alternating current, a control circuit connected to said source of alternating current, to said coil means, and to said circuit for momentarily applying time-spaced pulses of said alternating current to said coil means and for applying to said circuit in the interval after plural energization of said coil means signals induced in said coil of the frequency of said source due to precession of hydrogen nuclei in said unidirectional field.

6. In electrical well logging the improvement which comprises an exploring unit suspended at a measuring level in said well bore and including means for producing a unidirectional magnetic field of predetermined maximum strength $H_o$ in formations adjacent thereto to establish a predominant orientation of those nuclei in said field which possess a magnetic moment, coil means in said unit oriented with its axis normal to said unidirectional field at said level, a source of alternating current for producing a white noise signal within the frequency limits of $\gamma_{Na}H_o/2\pi$ and $\gamma_h H_o/2\pi$ cycles per second where $\gamma_{Na}$ is the gyromagnetic ratio for sodium and $\gamma_h$ is the gyromagnetic ratio for hydrogen, switching means for repeatedly momentarily connecting said source of alternating current to said coil means to establish a plurality of time-spaced rotating magnetic fields normal to said unidirectional field to upset the predominant orientation of all atoms having gyromagnetic ratios greater than that of sodium in said formations, detecting means responsive to varying magnetic fields of the frequencies within said limits for detecting in the interval following plural applications of said alternating current to said coil means varying magnetic fields due substantially entirely to precession of hydrogen nuclei in said unidirectional field, and means for indicating the relative values of said varying fields.

7. A system for logging formations adjacent a well bore which comprises means for generating at a measuring level in said well bore a unidirectional magnetic field having a field strength that does not exceed a predetermined maximum value $H_o$ at any point in said formations to establish a predominant orientation of nuclei in said field, means for applying time-spaced alternating magnetic fields substantially normal to said unidirectional magnetic field at said level having a frequency between an upper frequency $f_1 = \gamma_h H_o/2\pi$ and a lower frequency $f_2 = \gamma_{Na} H_o/2\pi$ where $\gamma_h$ is the gyromagnetic ratio of hydrogen and $\gamma_{Na}$ is the gyromagnetic ratio for sodium to impart energy to said predominantly oriented nuclei to displace them from their predominant orientation, and means for indicating at said frequency the electromagnetic field echoes of the displacement of said nuclei from said predominant orientation following application of said time-spaced alternating magnetic fields for determination of the molecular association of hydrogen atoms in the fields in said formations.

8. A method for logging a well bore in which nuclei in formations adjacent thereto which possess a magnetic moment are polarized in a unidirectional magnetic field in said formations to establish a predominant orientation thereof, the steps which comprise producing a second magnetic field substantially normal to said unidirectional field at said level whereby said predominant orientation of nuclei is disturbed, detecting hydrogen-dependent, varying fields following removal of said second magnetic field to produce a signal due substantially entirely to precession of said nuclei in said unidirectional field, and registering said signal in correlation with the depth of said registering level.

9. A method for logging a well bore in which nuclei in formations adjacent thereto which possess a magnetic moment are polarized in a unidirectional magnetic field in said formations to establish a predominant orientation thereof, the steps which comprise producing pulsed magnetic fields substantially normal to said unidirectional field at said level whereby said predominant orientation of nuclei is disturbed, detecting hydrogen-dependent, varying fields following removal of said pulsed magnetic fields to produce a signal due substantially entirely to precession of said nuclei in said unidirectional field, and measuring said signal in correlation with the depth of said measuring level.

10. In a system for logging a well bore in which nuclei in formations adjacent thereto which possess a magnetic moment are polarized in a unidirectional magnetic field having a field strength that does not exceed a predetermined maximum value $H_o$ at any point in said formations wherein at a measuring level there is established a predominant orientation of said nuclei, the combination therewith which comprises means for applying time-spaced alternating magnetic fields substantially normal to said unidirectional magnetic field at a measuring level, said alternating magnetic fields having a frequency between an upper frequency $f_1 = \gamma_h H_o/2\pi$ and a lower frequency $f_2 = \gamma_{Na} H_o/2\pi$ where $\gamma_h$ is the gyromagnetic ratio for hydrogen and $\gamma_{Na}$ is the gyromagnetic ratio for sodium to impart energy to the predominantly oriented nuclei to displace them from their predominant orientation, detecting means responsive to varying fields following removal of said alternating magnetic fields due substantially entirely to precession of nuclei in said unidirectional field, and means responsive to said detecting means for registering said output signals as a function of depth.

11. A method of logging a well bore in which nuclei in formations adjacent thereto which possess a magnetic moment are polarized in a unidirectional magnetic field having a field strength that does not exceed a predetermined maximum value $H_o$ at any point in said formations, the steps which comprise producing a second magnetic field substantially normal to said unidirectional field at a selected level in said well bore having a frequency between an upper frequency $f_1 = \gamma_h H_o/2\pi$ and a lower frequency $f_2 = \gamma_{Na} H_o/2\pi$ where $\gamma_h$ is the gyromagnetic ratio for hydrogen and $\gamma_{Na}$ is the gyromagnetic ratio for sodium whereby the predominant orientation of nuclei is disturbed, generating output signals representative of varying fields following removal of said second magnetic field which are due substantially entirely to precession of said nuclei in said unidirectional field, and registering said signal in correlation with the depth of said selected level.

12. The method of identifying at a plurality of measuring levels in a well bore the presence of materials at said measuring levels which include hydrogen nuclei polarized in a unidirectional magnetic field which comprises producing free precession of nuclei of said materials at said measuring level which exhibit a macroscopic magnetic moment by generating at each said measuring level a magnetic field at a substantial angle to said unidirectional magnetic field and abruptly removing said generated magnetic field, selectively generating an output signal having a frequency which is characteristic of the precession of the macroscopic moment vector of hydrogen nuclei produced by said abrupt termination of said field and dependent in amplitude upon the number of hydrogen nuclei, and recording said output signal characteristic of said vector of hydrogen nuclei in correlation with the depths of said measuring levels for production of a record indicative of regions in which hydrogen atoms are concentrated.

13. The method of producing at a plurality of measuring levels in a well bore free precession of nuclei of materials of said formations which exhibit a macroscopic magnetic moment and are initially predominantly oriented in a unidirectional magnetic field, which comprises at each of said measuring levels applying to said unidirectional magnetic field which establishes the predominant orientation of said nuclei a second magnetic field at a substantial angle to the direction of said unidirectional magnetic field and abruptly removing said second magnetic field, generating an output signal from the resultant precession of the macroscopic moment vector of hydrogen nuclei, and recording said output signal in correlation with the depths of said measuring levels for producing a record of distinctive character for identification of hydrogen-bearing strata present at said measuring levels.

14. A system for producing signals for the identification of the occurrence of hydrogen-bearing strata in a well bore, the nuclei of such hydrogen-bearing strata possessing a magnetic moment and predominantly oriented in a unidirectional magnetic field, comprising means for generating at each said measuring level a magnetic field at a substantial angle to said unidirectional magnetic field and for abruptly removing said generated magnetic field thereby to produce precession of the macroscopic moment vector of hydrogen, detecting means responsive to said precession of said moment vector of hydrogen for producing an output signal, exhibiting means, and means including connections between said exhibiting means and said detecting means for production in correlation with the depths of said measuring levels indications of the magnitudes of said output signals.

PO-1050
(5/69)

UNITED STATES PATENT OFFICE
CERTIFICATE OF CORRECTION

Patent No. 3,597,681            Dated August 3, 1971

Inventor(s) William B. Huckabay et al

It is certified that error appears in the above-identified patent and that said Letters Patent are hereby corrected as shown below:

Col. 2, line 45, "of" should be --or--;
       line 61, "in" should be --by--.
Col. 3, line 70, "H." should be --$H_o$.--.
Col. 9, line 34, "said nuclei" should be --hydrogen nuclei--;
       line 36, "registering" should be --measuring--;
       line 46, "said nuclei" should be --hydrogen nuclei--;
       line 47, "measuring" should be --registering--;
       line 64, before "following" insert --for generating output signals--.

Signed and sealed this 25th day of January 1972.

(SEAL)
Attest:

EDWARD M. FLETCHER, JR.
Attesting Officer

ROBERT GOTTSCHALK
Commissioner of Patents